United States Patent
Goossen

[11] Patent Number: 5,943,155
[45] Date of Patent: Aug. 24, 1999

[54] MARS OPTICAL MODULATORS

[75] Inventor: Keith Wayne Goossen, Aberdeen, N.J.

[73] Assignee: Lucent Techonolgies Inc., Murray Hill, N.J.

[21] Appl. No.: 09/133,065

[22] Filed: Aug. 12, 1998

[51] Int. Cl.[6] .............................. G02F 1/29; G02F 1/01; G02B 26/08
[52] U.S. Cl. ...................... 359/247; 359/290; 359/291; 359/295; 359/318
[58] Field of Search .................................. 359/223, 224, 359/290, 291, 295, 318, 248, 247, 245

[56] References Cited

U.S. PATENT DOCUMENTS

5,654,819  8/1997  Goossen et al. .................. 359/291
5,739,945  4/1998  Tayebati ............................ 359/291

*Primary Examiner*—Georgia Epps
*Assistant Examiner*—Margaret Burke

[57] ABSTRACT

The specification describes a double poly Mechanical Anti-Reflection Switch (MARS) device in which transition layers of $SiN_x$ are provided on either side of the air gap, and the thickness ratio of the two transition layers is adjusted to provide a tradeoff between the insertion loss of the device and the optical bandwidth.

20 Claims, 6 Drawing Sheets

FIG. 1

$m\lambda/4$ gap

FIG. 2

$(m-1)\lambda/4$ gap

MARS OPTICAL MODULATORS

FIELD OF THE INVENTION

The invention relates to Moving Anti-Reflection Switch (MARS) devices.

BACKGROUND OF THE INVENTION

It is generally though that surface-normal optoelectronic devices, i.e. those for which the flow of light is perpendicular to the surface of the device, are less expensive to produce and package than waveguide devices in which the flow of light is parallel to the device surface. Testing of surface-normal devices can be performed easily at the wafer level, increasing yield and reducing cost. In packaging, greater alignment tolerance is available due to the relatively large optical windows of surface-normal devices in comparison with the small thickness of active layers in planar waveguide devices, or the core diameter of optical fibers. For lasers, the emitted optical mode may be circular, which adapts well to the core of an optical fiber and makes vertical cavity surface emitting lasers more attractive. Finally, surface-normal devices may be easily arranged in arrays for multi-fiber connections or for displays, such as liquid crystal displays.

The need for surface-normal optical modulators, e.g., whose optical reflectivity may be modulated by an electrical signal, was prompted a few years ago by proposals of fiber-to-the-home systems based on recirculation of light from the home to the central office. Typically, these proposals are for wavelength multiplexed passive systems which utilize an optical modulator at the subscriber location to replace the active LED or laser devices proposed in prior art systems. See, for example, L. Altwegg, A Azizi, P. Vogel, Y. Wang, and P. Wiler, "LOCNET—a fiber-in-the-loop system with no light-source at the subscriber end", *J. of Lightwave Tech.*, vol. 12, no. 3, pp. 535–540, 1994; also see: N. J. Frigo, P. D. Magill, T. E. Darcie, P. P. Iannone, M. M. Downs, B. N. Desai, U. Koren, T. L. Koch, C Dragone, and H. M. Presby, "RITE-Net: A passive optical network architecture based on the remote interrogation of terminal equipment," *Proc. of the Optical Fiber Conference—post deadline session*, (San Jose, Calif., Feb. 20–25, 1994) pp. 43–47. This approach has several advantages, among them lower cost and higher reliability. The passive devices are also less sensitive to temperature variations, and have a robustness suitable for the uncontrolled environment at some customer locations. Additionally, wavelength routing in the network is more reliable since the upstream light is identically the same wavelength as the downstream light. It also allows easier diagnostics of failures in the system. With a home light source based system, if the central exchange ceases receiving signals from the home, the cause can be either be a breakdown of the home laser or a fiber break. With a recirculating system, the cause can only be in transmission, i.e. a fiber break.

The most significant advantage of a recirculated system is that it can be multiplexed with several wavelengths (wavelength division multiplexing, WDM), thus increasing capacity. WDM offers great system flexibility since in the field a passive optical device, such as a wavelength grating router, may direct each particular wavelength to a particular home. It is generally thought that for any fiber-to-the-home system, a single fiber will be strung to an area of multiple homes, and a high bandwidth common channel will service all of those homes. It is also generally believed that the splitter that separates the individual signals from the common channel should be passive to reduce cost and increase reliability of the system. In a bidirectional system, a passive splitter also functions as a signal combiner for signals from the home to the central exchange (upstream). If the home is provided with a laser source, as in a non-recirculating system, that laser must be an expensive single frequency device with precisely controlled output, and controlled environment, to match the wavelength assigned to the downstream signal. However, this function is relatively simple in a WDM recirculating system since the upstream wavelengths are inherently precisely the same as the downstream wavelengths.

Therefore, it is evident that recirculating systems are preferable for more versatile WDM systems. For these systems, there is a need for an inexpensive, robust modulator that operates over a range of wavelengths and, for reasons explained above, is a surface-normal device. There is a need in the art for surface-normal modulators with response times shorter than 10 $\mu$s, and with high contrast ratio and wide optical bandwidth.

Recently, a low-cost silicon optical modulator has been developed based on micro electro mechanical systems principles (MEMS) which fulfills the foregoing objectives, e.g. a low-cost, high production volume, modulator that operates over a wide optical band, and provides high contrast and relatively short response times. The device has been designated MARS, for Moving Anti-Reflection Switch. This device has a movable conductive membrane suspended over a conductive substrate. With an appropriate electrostatic field the membrane is controllably moved toward, or away from, the substrate thus producing a precisely controlled air gap between the membrane and the substrate. With proper positioning of the membrane with respect to the substrate the MARS device can be switched from a reflecting state to an anti-reflecting state. For more details of the basic MARS device see K. W. Goossen, J. A. Walker, and S. C. Arney, "Silicon modulator based on Mechanically-Active Anti-Reflection layer with 1 Mbit/sec capability for fiber-in-the-loop applications," *IEEE Phot. Tech. Lett.*, vol. 6, pp. 1119–1121, September 1994.

The basic MARS structure, as described in this reference, has an inherently large optical bandwidth. The insertion loss of a device with the basic structure, which is essentially the absorption of the device in the reflecting state, is also a relatively fixed property of the structure. Reflectivity in the reflecting state is typically limited to approximately 72%.

MARS devices have been modified to optimize the loss in the device, reducing the insertion loss to near zero. See C. Marxer et al., Transducers '95, Stockholm, Sweden, June, 1995, pp. 66-B1. However, the low loss design has reduced optical bandwidth in the anti-reflecting state, with e.g. -20 dB in reflectivity achievable over a wavelength range of less than 10 nm.

There exists in the art applications where neither limitation is desirable, i.e. where relatively high optical bandwidth is required but also relatively low insertion loss. It would be advantageous to have a MARS device design in which the tradeoff between optical bandwidth and loss can be adjusted to meet a particular system specification.

SUMMARY OF THE INVENTION

An improved MARS device design has been developed in which the insertion loss and the optical bandwidth can be tailored over a wide and continuous range. The improved design incorporates an active optical layer between the substrate and the lower polysilicon metallization in addition to an active optical layer in the movable membrane. The preferred layers are silicon nitride layers with the relative thickness of the layers chosen to yield the desired tradeoff point in insertion loss vs. optical bandwidth.

DETAILED DESCRIPTION

Figure 1:
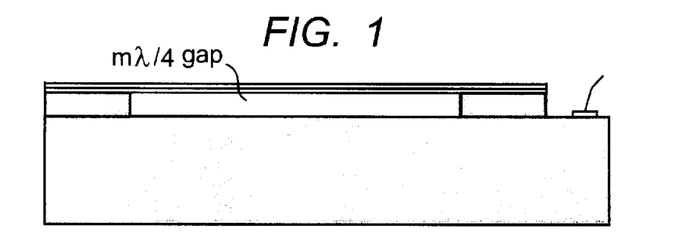
FIG. 1 is a schematic representation of the operation of a moving anti-reflection switch or MARS device showing the reflection state of the switch.

The operating principle of the MARS device is based on the change in an air gap between a suspended membrane, e.g. a silicon nitride film, and the underlying substrate as seen in FIG. 1. The membrane has a refractive index is equal to the square root of the refractive index of the substrate, and a thickness equal to ¼ of the wavelength of the incident light $\lambda$. The membrane is suspended by a web comprising the optically active film, i.e. the silicon nitride film, and metallization on the top side of the film. In some embodiments the metallization is selectively applied to leave a window for the optical beam.

In the most fundamental case, if the air gap is equal to zero (contact with the substrate), a typical anti-reflection condition is achieved. If the nitride film is suspended above the substrate by an air gap equal to $\lambda/4$ however, a high reflection (>70%) condition is achieved. As could be expected, this relationship would hold for any value of $m\lambda/4$ (m even—anti-reflecting, m odd—reflecting). For a typical MARS device, an initial air gap of $3\lambda/4$ is used to avoid stiction problems during operation and enhance the lifetime of the devices.

Figure 2:
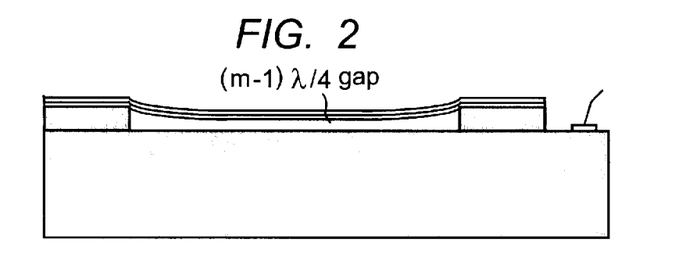
FIG. 2 is a representation similar to that of FIG. 1 showing the switch in the anti-reflecting state.

The reflecting state is illustrated in FIG. 1 and the anti-reflecting state is illustrated in FIG. 2. The movable membrane is shown in these figures as a two layer structure. In some known embodiments of the MARS structure the flexible membrane comprises a three layer structure with the optically active layer sandwiched between conductive films. The conductive films are typically polysilicon or amorphous silicon. This MARS structure is often referred to as a double-poly MARS device, and is described and claimed in U.S. Pat. No. 5,654,819, issued Aug. 5, 1997. The optically active layer is preferably silicon nitride, $SiN_x$, but other materials, e.g. $SiO_xN_y$ with suitable refractive indices may be substituted.

What distinguishes the conventional MARS device from other electromechanical interference modulators is that between the air gap and the substrate there are no coatings. Therefore, the MARS device can be thought of as a Fabry-Perot etalon where the air gap is the cavity and the substrate-air interface is the bottom mirror. See H. A. McLeod, *Thin Film Optical Filters*, Adam Hilger Ltd., Bristol. Since the refractive index of silicon is about 3.5, the reflectivity of the silicon-air interface is $(3.5-1)^2/(3.5+1)^2=0.31$, which leads to a finesse (F) of 2.6 when this interface forms one mirror of the cavity. This finesse translates into a reflection bandwidth of about 10% of the center wavelength (for a cavity equal to half the center wavelength), or about 150 nm for the desirable fiber-optic wavelengths. Additionally, this translates into a maximum reflectivity of $F/(1+F)$, or 72% resulting in an insertion loss of 1.43 dB. This loss is low enough for most applications, results in a wavelength bandwidth sufficient for most WDM applications, and is realizable in a relatively simple structure. The MARS device may be designed with any membrane with a reflectivity that matches that of the substrate at some air gap, and most simply has a silicon nitride membrane and a polysilicon electrode (or a metal electrode with a hole cut for the optical beam) whose index is approximately the square root of the index of the substrate, or approximately 1.87 for silicon, and whose thickness is a quarter wavelength (as measured in the membrane). The use of this membrane results in zero reflectivity with an air gap of $\lambda/2$. As shown by Goossen et al, a MARS modulator may be designed with a single layer membrane of any index equal to or greater than the square root of the index of the substrate, including the index of the substrate, by operating at a different air gap for zero reflectivity. Also, the membrane may be multi-layered. See "The effect of membrane curvature on the optical perofrmance of the Mechanical Anti-Reflection Switch (MARS) modulator", in *Microelectronic Structures and MEMS for Optical Processing III*, M. Edward Motamedi, Hans Peter Herzig, Ed., Proc. of SPIE vol. 3226, pp. 147–154 (1997).

Figure 3:
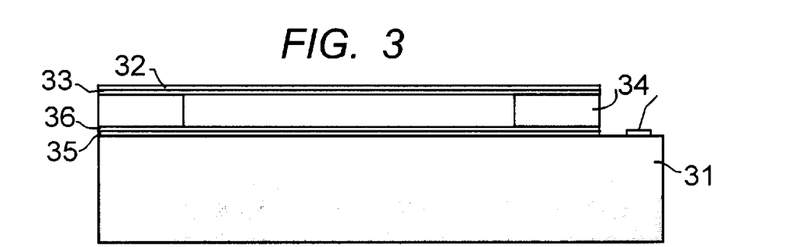
FIG. 3 is a schematic view of the improved MARS device structure according to the invention.

In the improved structure of the invention, illustrated schematically in FIG. 3, a silicon substrate is shown at 31 with the movable membrane comprising active optical layer 32, and metallization layer 33 on the underside of the active layer. Metallization as referred to here may be any suitable conductive material, preferably polysilicon. The substrate 31 is coated with the transition layer that forms the main element of the invention and comprises optically active layer 35 and metallization 36. The transition layers provide the means for adjusting the optical properties of the MARS device.

Figure 4:
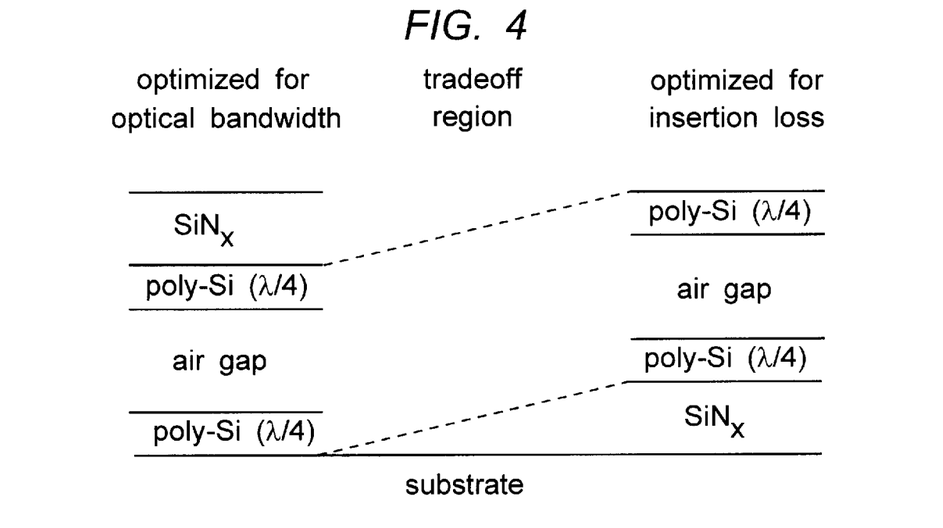
FIG. 4 is a schematic representation of the layers in the improved MARS device showing the transition region of the invention.

The transition layers are schematically shown in FIG. 4, where the layered structure on the left side of the figure corresponds to the basic MARS structure and gives essentially maximum optical bandwidth, and the layered structure on the right side of the figure gives essentially minimum insertion loss. The transition region of the invention lies between these end points as shown, and the transition is implemented, as is evident, by changing the relative thickness of the transition layers, here shown as $SiN_x$, between the layer on the movable membrane and the layer on the substrate. The polysilicon layer between the substrate and the air gap on the left side of the figure is present for tutorial reasons to illustrate the transition just mentioned, but is actually and functionally the equivalent of the silicon substrate in the prior art device on the left of the figure. It should be understood from FIGS. 3 and 4 that the device of the invention has two active optical layers, one on either side of the air gap, and the presence of these two optical layers, and the thickness relationship between them, determines the operating point in the transition region between minimum insertion loss of the device and maximum optical bandwidth.

Figure 5:
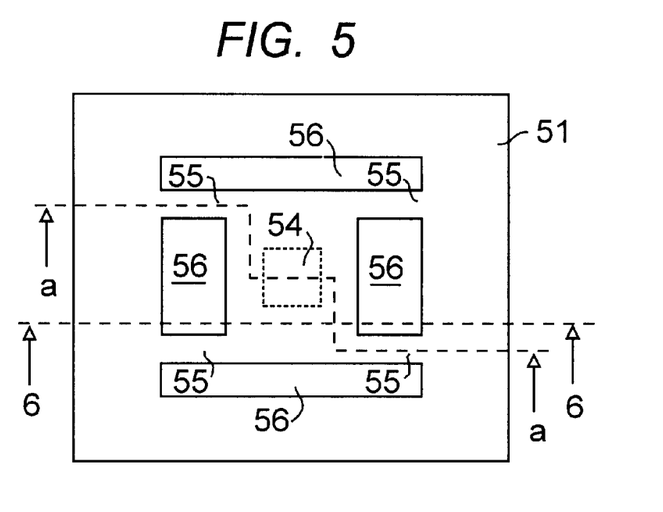
FIG. 5 is a topographical view of the device of FIGS. 1 and 2.

The MARS device of the invention is shown in plan view in FIG. 5. The section a—a is the view shown in FIGS. 1–4. The sectional views used for FIGS. 1–3, which are not to scale, illustrate the basic electrostatic mechanism for the MARS device. The overall device structure appears in FIG. 5, where the silicon nitride membrane is shown at 51. The optically active region comprises region 54 where the beam is incident on the MARS structure. Openings through the membrane structure are formed where the substrate (actually the transition layer 56,57 on the substrate) is visible. These openings form the weblike structure that suspends the silicon nitride active optical region over the air gap. In the geometry shown, there are four arms 55 supporting the flexible window. Other support arrangements can be used having e.g. three, or even two, support arms, or more than four if desired. For example, a preferred device structure has a circular suspended membrane which is continuously supported around its edge. See U.S. Pat. No. 5,751,469 issued May 12, 1998. In a typical embodiment this device has an array of holes arranged on hexagonally spaced centers and suitable spacing, e.g. 3 micron holes and 10 microns center to center.

The basic MARS device may have an extremely wide optical bandwidth by operating between air gaps of $\lambda/4$ and zero. However, this requires the membrane to impact the substrate, which is undesirable from a reliability standpoint. Therefore, it is preferred that the device be designed for zero reflectivity near an air gap of $\lambda/2$. A conventional MARS device operating between $3\lambda/4$ and $\lambda/2$ can provide a contrast greater than 10:1 (a usual specification for data transport) over an optical bandwidth of 142 nm, centered at 1550 nm, the usual center wavelength for WDM systems.

In the device represented by the schematic layered structure on the right of FIG. 4, coatings are added to the substrate to increase the finesse of the device. Adding a single pair of $SiN_x/Si$ quarter wave layers to the substrate increases the finesse to 36 (for a $SiN_x$ index of 1.87) resulting in a maximum theoretical reflectivity of 97% and an insertion loss of 0.12 dB. The device achieves zero reflectivity using a polysilicon quarter wave membrane at an air gap of $\lambda/2$. In the prior art device, a three quarter-wave thick membrane was used for practical realization. The use of additional half wave thicknesses in a dielectric stack decreases optical bandwidth even though the finesse, and therefor the insertion loss, remains unchanged. For a three quarter-wave thick membrane, operating between air gaps of $3\lambda/4$ and $\lambda/2$ contrast greater than 10:1 is maintained over an optical bandwidth of 34 nm, centered at 1550 nm. If a quarter-wave thick membrane is used (111 nm thick), an optical bandwidth of 41 nm would be obtained.

Figure 6:
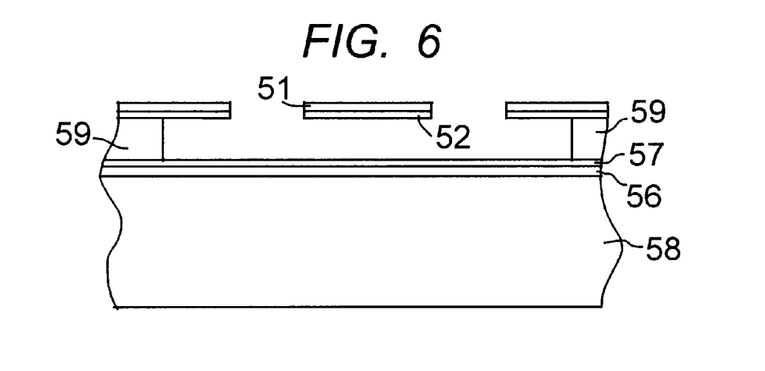
FIG. 6 is a sectional view through 6—6 of FIG. 5.

An understanding of the MARS device structure shown in FIG. 5 may be further enhanced with the aid of a typical processing sequence used to form the device. FIG. 6 shows a section 6—6 through FIG. 5 as indicated, and represents the goal of the processing steps. The polysilicon electrode 52, which was not visible in the plan view of FIG. 5, appears in this figure. If an opaque metal is substituted for polysilicon the optical window, region 54 in FIG. 5, may comprise the center portion of silicon nitride layer 51, with a window provided through the metallization 52. The thick standoff layer 59 is visible in FIG. 6, and its thickness, and the thickness of the transition layer 56, combine to determine the critical spacing between the silicon substrate 58 and the optically active membrane 51,52.

The geometry shown in FIGS. 5 and 6 is for a device operating in the 1–2 Mbit/sec range. In this particular embodiment the mechanically active area consists of a 30 $\mu m \times 30$ $\mu m$ plate suspended by 50 $\mu m$-long arms 55. The optical window 54 in this device is 22 $\mu m \times 22$ $\mu m$. The electrode layer 52, formed by conventional metallization techniques, i.e. photolithographic patterning, has a tab portion (not shown) that extends to a bonding pad to accommodate a wire bond to a header pin. Suitable low cost packages for these devices are described and claimed in U.S. Pat. No. 5,647,044.

The specific embodiment described here is based on micro electro mechanical systems principles that use surface micromachining techniques to form thin film microstructures. An advantage of these techniques is the batch fabrication of several thousand chips at a time, making the cost per chip extremely low (a few cents per chip).

Figure 7:
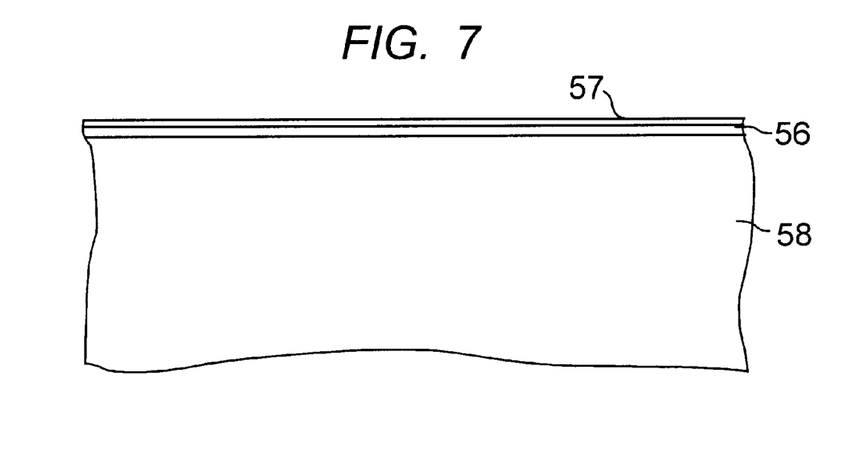
FIGS. 7–13 are schematic representations of process steps useful in fabricating the improved MARS device of the invention.

With reference to FIG. 7, the silicon substrate 58 is shown with insulating layer 56, and polysilicon layer 57. Layer 56 may be any suitable insulator but preferably is one that withstands etching of layer 59, i.e. has preferential etch characteristics with respect to the material, preferably glass, of layer 59. As stated before, the preferred insulating material is $SiN_x$, which resists etching by HF etchants used to dissolve layer 59. The $SiN_x$ layer may be stoichiometric (x=1) or slightly off (x=0.8–1.2), with the objective being an insulating material having a refractive index $\eta_i$ equal to $\eta_s^{1/2}$, where $\eta_s$ is the refractive index of the substrate. For silicon, $\eta_s$ is approximately 3.5, and $\eta_i$ for SiN is approximately 1.87 if x=1.4, and 2.0 if x is approximately 1.0. It is preferred that the index of the insulating layer be within 1.0–1.2 $\eta_s^{1/2}$.

The $SiN_x$ layer may be deposited by CVD, or preferably by LPCVD. If the upper transition layer 51 has a thickness $t_1$ and the lower transition layer 56 has a thickness $t_2$, the operating point in the transition region of FIG. 4 is determined by the relative thickness of layer 56 with respect to 51 according to:

$$t_1 = \left(\frac{\lambda}{4\eta_i}\right) - t_2$$

A device operating in the transition region of the invention has both layers 51 and 56, meaning that $t_1$ and $t_2$ are finite, e.g. greater than 50 Angstroms.

Figure 8:
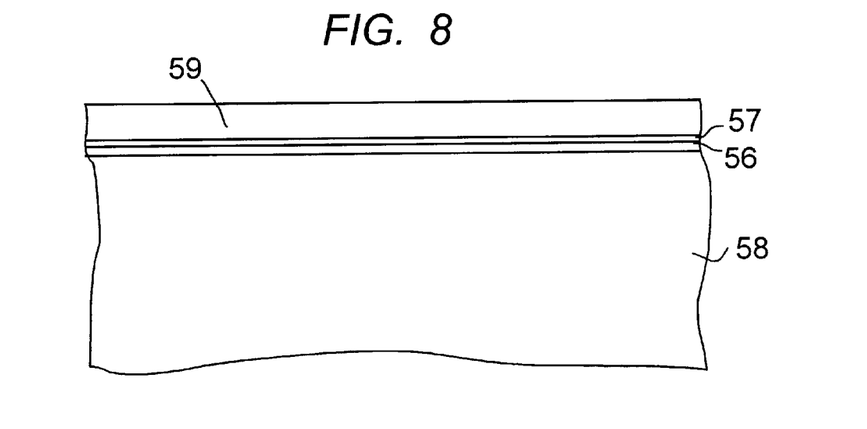

The spacer layer 59 is deposited over the insulating layer as shown in FIG. 8. This layer is sacrificial in the active device region, as shown in FIG. 6, and therefore is preferably of a material that etches easily and isotropically. Glass is the preferred material for this layer. The specific glass composition is not critical and a wide variety of glass materials may be suitable. In the devices made to demonstrate the invention the glass was conventional phosphosilicate glass (PSG). Alternatively, other glass compositions, including $SiO_2$, can be used.

Figure 9:
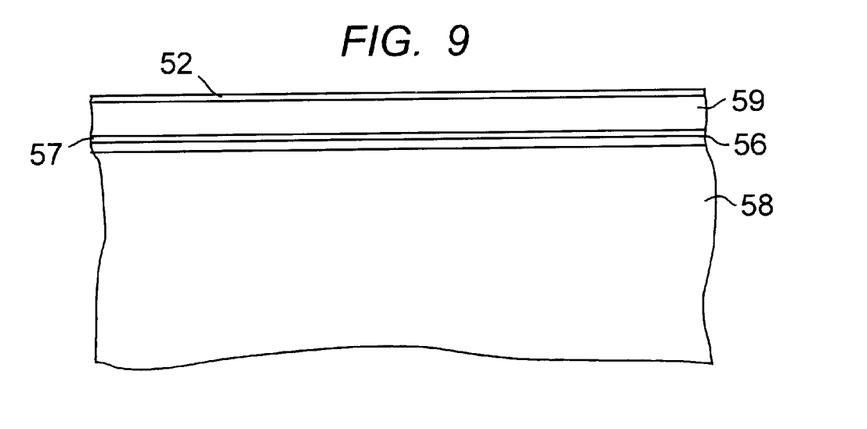
Figure 10:
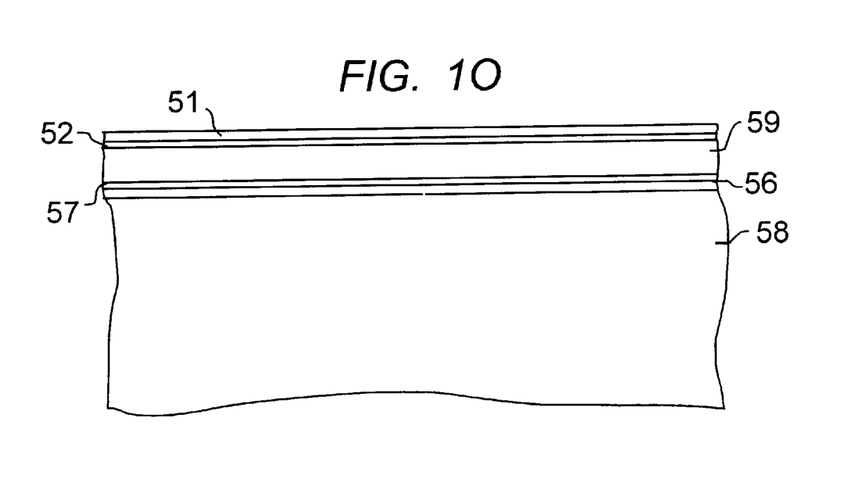

The next step is to deposit the membrane layers 51 and 52. As depicted in FIG. 9, the polysilicon electrode layer 52 is deposited over the spacer layer 59, followed by deposition of the $SiN_x$ transition layer 51, as shown in FIG. 10. Reference herein to polysilicon is for convenience, it being understood by those skilled in the art that amorphous silicon can be substituted. Suitable deposition techniques for layers 56,57,52 and 51 are well known and not part of the invention. The layers can be formed e.g. by LPCVD. The thickness of the conducting layer 52 is preferably one-quarter wavelength of the radiation being switched, as measured in the metallization material. For example, if the conducting layer is polysilicon, and the beam being switched is 1.55 $\mu m$, the thickness of layer 52 is preferably approximately 1100

Angstroms. An advantage of using polysilicon for layers 57 and 52 is that the index of refraction of these layers essentially matches the index of refraction of substrate 58. Polysilicon is also relatively transparent to laser radiation of interest, i.e. 1.3 $\mu$m and 1.55 $\mu$m.

Techniques for tailoring the refractive index of a material are well known and described in, e.g., Smith et al, "Mechanism of $SiN_xH_y$ Deposition From $N_2$—$SiH_4$ Plasma", J. Vac. Sci. Tech. B(8), #3, pp 551–557 (1990).

Figure 11:
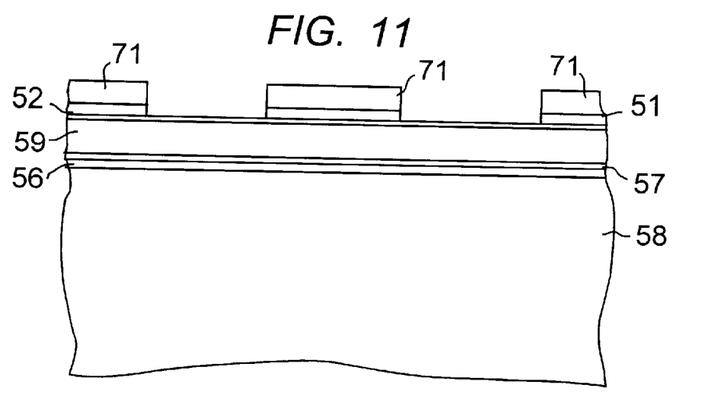
Figure 12:
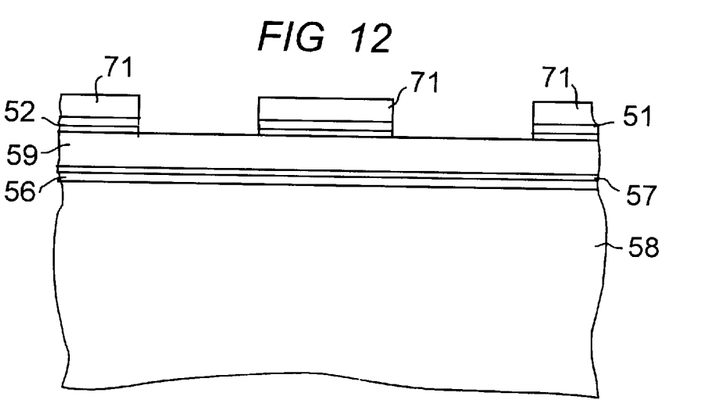

With reference to FIG. 11, the structure is then masked by a conventional photolithographic mask 71 to define the support arm configuration, and to provide access to the cavity that forms the air gap, as will be described. With the patterned photomask in place, the exposed portions of layers 51 and 52 are etched as shown in FIGS. 11 and 12. These layers are preferably dry etched by RIE which is anisotropic and produces a well defined sidewall structure as represented in FIG. 12.

An electrical contact is made to layer 52 by forming a via through layer 51. If layer 57 is conducting, a contact via is made to it. If it is not, contact is made to the substrate.

Figure 13:
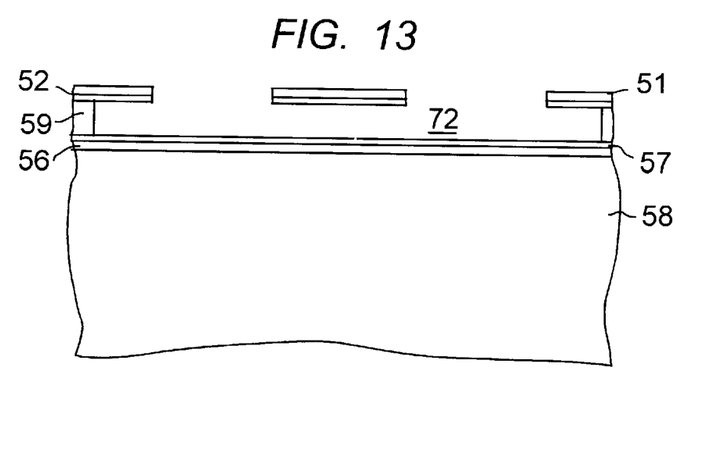

The cavity forming the air gap for the MARS device is then formed by isotropically etching the portions of layer 59 exposed by the openings formed by the last step. To obtain isotropic etching, and the necessary undercut to produce the desired cavity, a wet etchant is used. Various wet etchants may be used, for example HF. Etching proceeds laterally as well as vertically with the result shown in FIG. 13, i.e. cavity 72 formed below the optically active region.

Computer modeling of MARS devices described above shows the effectiveness of using transition layers according to the invention, and establishes that any point between the extremes shown in FIG. 4 can be used as the operating point for a MARS device. Results of these models are shown in FIGS. 14 and 15.

Figure 14:
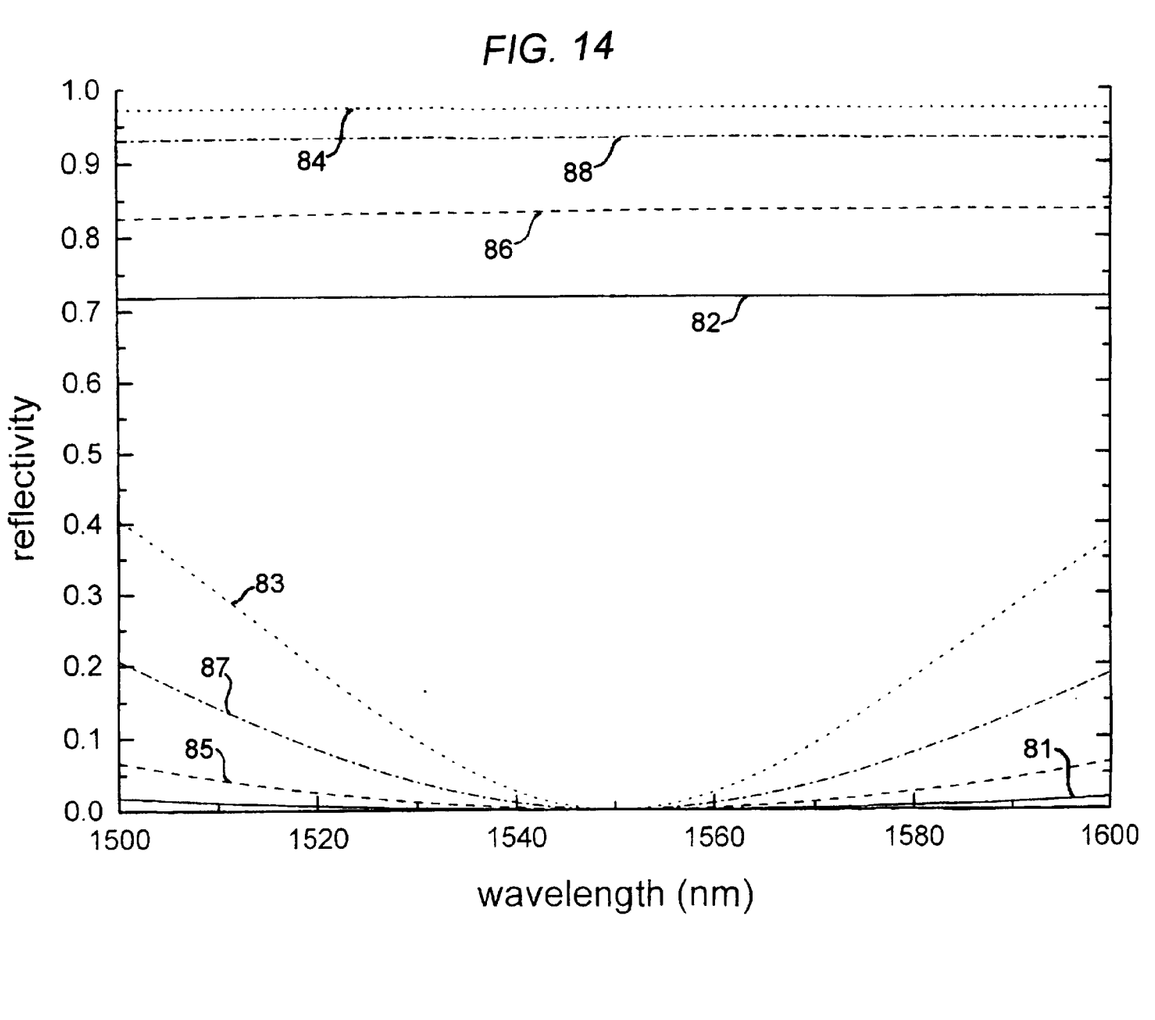
FIG. 14 is a plot of wavelength vs. reflectivity illustrating the tradeoffs between reflectivity (insertion loss) and optical bandwidth afforded by the invention.
Figure 15:
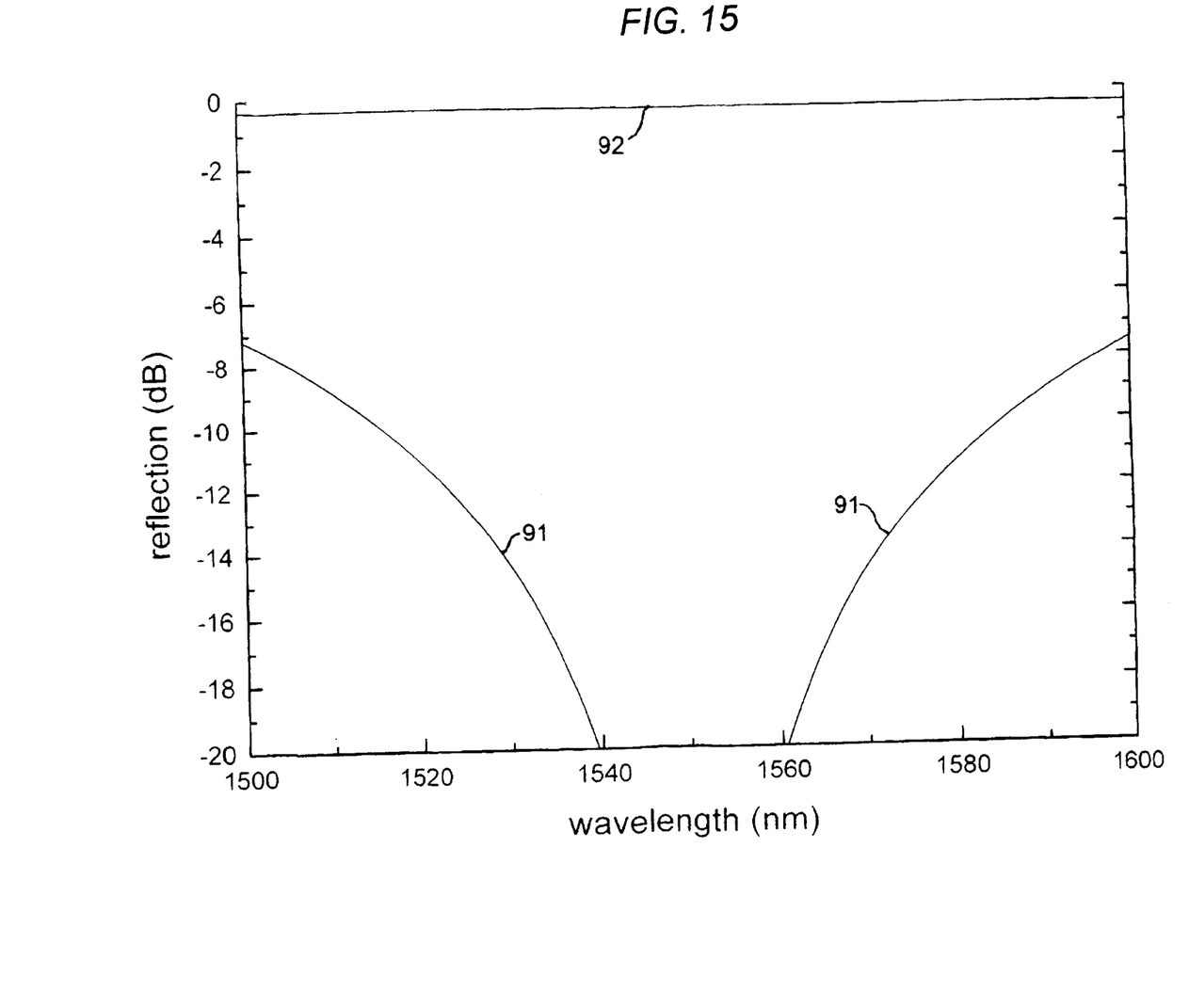
FIG. 15 is a plot of reflection in dB vs. wavelength for an illustrative embodiment of the invention.

With reference to FIG. 14, eight curves are shown. Curves 81, 83, 85 and 87 are for measurements made in the anti-reflecting state, and curves 82, 84, 86 and 88 are for measurements made in the reflecting state. The substrate in these devices was silicon with a refractive index of 3.48. The silicon nitride active optical layer was silicon nitride with a refractive index equal to the square root of 3.48, i.e. 1.87. The excursion of the optically active region of the membrane was between air gaps of $3/4\lambda$ and $\lambda/2$. The optical signal was at 1.55 $\mu$m. The solid curves, 81 and 82, show reflectivity vs. wavelength for a conventional MARS device in which the silicon substrate is uncoated. The gap distance for the reflecting state was 11625 Angstroms, or approximately $3\lambda/4$, and the gap distance for the anti-reflecting state was 7750 Angstroms, or approximately $2\lambda/4$.

The thickness of the glass offset layer (59 in FIG. 6) was approximately 1.1625 $\mu$m. These curves represent the case shown at the left in FIG. 4. The reflectivity limit of 72% in the reflective state, and the relatively wide optical bandwidth are apparent.

Curves 83 and 84 show reflectivity vs. wavelength for a device with a $SiN_x$ substrate coating, and no $SiN_x$ coating on the membrane. This represents the case shown on the right of FIG. 4. The high reflectivity in the reflective state (low insertion loss), and the relatively narrow bandwidth can be seen.

The other two cases are for devices in which the operating point is in the transition range of FIG. 4. Curves 85 and 86 are for a device with a $SiN_x$ coating of 500 Angstroms on the silicon substrate, i.e. layer 56 in the figures, and a layer approximately 1577 Angstroms on the membrane, i.e. layer 51 in the figures. It is evident that with operation in the transition zone, using two transition layers 51 and 56 with appropriate relative thickness, the optical bandwidth is superior to that of the prior art modified MARS device (right side of FIG. 4), and the insertion loss is superior to that for the standard MARS device (left side of FIG. 4). The curves 87 and 88 are for a device with a 1000 Angstrom coating on the silicon substrate, i.e. 56 in the figures, and a coating of approximately 1077 Angstroms on the membrane, i.e. 51 in the figures (t of layer 56+t of layer 51=~2077). The insertion loss for this device lies between the value for the optimized device of curve 84 and the values for the other two devices just described, while the optical bandwidth lies between that for the modified MARS device and the device (just described) which operates in the transition region closer to the left hand side.

Optical data for another embodiment of the invention is given in FIG. 15, which is a plot of optical bandwidth against reflectivity, with reflectivity in this case expressed in terms of dB. Curves 91 are for the anti-reflecting state, and curve 92 represents the reflecting state. This device has an operating point that is precisely in the middle of the transition region, where the thickness of layer 56 is the same as the thickness of layer 51, i.e. both are 1015 Angstroms. In this case the index $\eta$ of the $SiN_x$ transition layers 51 and 56 was 2.

It should be evident from the above that in the devices of the invention an important feature is a variable air gap, with means for applying an electrical field across the air gap. The means in this case includes conductive layers on either side of the air gap. In the embodiments shown, it is convenient for the polysilicon layers to serve this function. Appropriate contacts to these layers are made by well known techniques. Alternatively, 52 can be non-conducting, e.g. near intrinsic polysilicon. In this case a metal contact layer, e.g. tin oxide, can be formed over the insulating layer 51. If the metal contact layer is opaque to the signal wavelength, a window may be provided in the contact layer. Similar variations may be made on the substrate side of the air gap. If the lower polysilicon layer 57 is not sufficiently conductive, the electrical contact can be made directly to the substrate. If the substrate is insulating, a metal contact layer can be provided on the surface of the substrate.

The optical wavelengths of most interest in current photonic devices are 1.3 $\mu$m and 1.55 $\mu$m. These wavelengths correspond to spectral regions of ultra high transparency and resultant transmission efficiency in silica based transmission media. However, the invention described above is useful for any optical wavelength, e.g. 0.5–2.0 $\mu$m with suitable adjustment of the device dimensions.

From earlier discussions, e.g. in connection with FIGS. 1 and 2, it is apparent that the devices described above are useful for optical switches where the optical beam is switched between an optimally reflecting to an optically anti-reflecting state, and it is anticipated that these devices will be used in commercial systems for that function. However, the devices may also be used as variable optical attenuators and can be used in optical systems to equalize light intensity of multiple beams in e.g. WDM systems. In such applications the device is electrooptically switched or adjusted most typically between states that are partially reflecting (or partially anti-reflecting).

The invention has been described in terms of a silicon substrate and silicon optoelectronic devices. It will occur to those skilled in the art that various forms of hybrid structures can also be used thus allowing flexibility in the choice of material for the optoelectronic device. In particular, gallium arsenide devices are widely used in lightwave technology. In the case of the MARS device, the electrical function of the device does not require a semiconductor material and a wide variety of conductive materials for the device substrate are possible. In the context of this disclosure, semiconductor materials such as silicon are intended to be within the definition of conductive materials. For other forms of optical modulators, crystal materials like lithium niobate could be used. In each of these cases the active device itself can be mounted or bonded on a silicon substrate to obtain the advantages of this invention.

Various additional modifications of the invention may be made by those skilled in the art. All variations that basically rely on the teachings through which this invention has advanced the art, or the equivalents of those variations, are properly considered within the scope of this invention.

We claim:

1. An electrooptic device comprising:
   (a) a substrate having a refractive index $\eta$, and having at least two layers (i) and (ii) on the surface thereof, wherein
      (i) is a layer having a thickness $t_1$ greater than 50 Angstroms, and an index of refraction approximately equal to $\eta^{1/2}$, and
      (ii) is a layer with a refractive index $\eta$, and a thickness $t_2$,
   (b) a membrane having an optically transparent portion and comprising at least two layers (iii) and (iv), wherein
      layer (iii) is a layer with a refractive index $\eta$, and a thickness $t_3$, and
      layer (iv) is a layer with a refractive index approximately equal to $\eta^{1/2}$, and a thickness $t_4$, where $t_4$ is greater than 50 Angstroms,
   (c) means for directing a beam of light on said optically transparent portion of said membrane, said light having a wavelength $\lambda$, where $\lambda$ and $t_1$ and $t_4$ are related by:

$$t_1 = (\lambda/4\eta^{1/2}) t_4$$

(d) a flexible support for positioning the optically transparent portion of said membrane at a first position spaced from said substrate and defining an air gap $d_1$ between said layer (ii) and said layer (iii), and a second position spaced from said substrate defining an air gap $d_2$ between said layer (ii) and layer (iii), and
   (e) means for applying an electrical bias across said air gap to optically switch said optically transparent portion of said membrane from said first position to said second position.

2. The modulator of claim 1 wherein $d_1$ and $d_2$ are approximately equal to $m\lambda/4$, and m is an odd integer for $d_1$ and an even integer for $d_2$.

3. The modulator of claim 1 wherein said conductive substrate is a semiconductor.

4. The modulator of claim 1 wherein said conductive substrate is silicon.

5. The modulator of claim 2 wherein layer (i) and (iv) comprises $SiN_x$.

6. The modulator of claim 1 wherein $\lambda$ is 1.55 $\mu$m.

7. The modulator of claim 1 wherein layer (ii) is polysilicon.

8. The modulator of claim 1 wherein layer (iii) is polysilicon.

9. The modulator of claim 8 wherein layer (ii) is polysilicon.

10. A method for modulating light comprising:
    (a) directing a beam of light with a wavelength $\lambda$ on a substrate, said substrate having a refractive index $\eta$, and having at least two layers (i) and (ii) thereon, wherein:
       (i) is a layer with a thickness $t_1$, and a refractive index approximately equal to $\eta^{1/2}$,
       (ii) is a layer with a refractive index $\eta$, and a thickness approximately equal to $\lambda/4\eta$,
    (b) providing a membrane spaced from said substrate, said membrane having an optically transparent portion and comprising at least two layers (iii), and (iv), wherein
       layer (iii) is a layer with a refractive index $\eta$, and a thickness approximately equal to $\lambda/4\eta$,
       layer (iv) is a layer with a refractive index approximately equal to $\eta^{1/2}$, and a thickness $t_2$, wherein:

$$t_1 = (\lambda/4\eta^{1/2}) - t_2$$

(c) providing a flexible support for positioning said optically transparent portion of said membrane at a first position spaced from said substrate and defining an air gap $d_1$ between said layers (ii) and (iii), and a second position spaced from said substrate defining an air gap $d_2$ between said layers (ii) and (iii), and
    (d) applying an electrical bias across said air gap to switch said optically transparent portion of said membrane from said first position to said second position.

11. The method of claim 10 wherein $d_1$ and $d_2$ are approximately equal to $m\lambda/4t$, where m is an odd integer for $d_1$ and an even integer for $d_2$.

12. The method of claim 10 wherein said substrate is a semiconductor.

13. The method of claim 12 wherein said substrate is silicon.

14. The method of claim 10 wherein said layers (i) and (iv) comprise $SiN_x$.

15. The method of claim 10 wherein $\lambda$ is 1.55 $\mu$m.

16. The method of claim 10 wherein layer (ii) is polysilicon.

17. The method of claim 10 wherein layer (iii) is polysilicon.

18. The method of claim 17 wherein layer (ii) is polysilicon.

19. A method for fabricating an electrooptic modulator comprising the steps of:
    a. depositing a first dielectric layer having a thickness $t_1$ on a semiconductor substrate,
    b. depositing a first polysilicon layer on said first dielectric layer,
    c. depositing a glass layer on said first polysilicon layer,
    d. depositing a second polysilicon layer on said glass layer,
    e. depositing a second dielectric layer with a thickness $t_2$ on said second polysilicon layer, said dielectric layer selected from the group consisting of silicon dioxide and silicon nitride, and wherein $t_1+t_2$ equal approximately 2077 $\mu$m,
    f. masking said dielectric layer with a photomask having a central membrane feature and at least three arms extending from said central membrane feature to a peripheral frame, leaving exposed portions corresponding with spaces between said arms,
    g. etching through said dielectric layer and said second polysilicon layer using a plasma etch and using said photomask as an etch mask, to form openings corresponding with said spaces between said arms and expose portions of said glass layer in said openings, and h. etching through said glass layer in said exposed portions and under said arms using a wet etchant, thereby forming an air gap between said insulating layer and said central membrane feature and leaving said central membrane feature supported by said arms.

20. The method of claim 19 wherein the glass is phosphosilicate glass and the wet etchant comprises HF.

* * * * *